United States Patent [19]

Watkins

[11] Patent Number: 5,323,860
[45] Date of Patent: Jun. 28, 1994

[54] APPARATUS FOR CONNECTING A DIVERTER ASSEMBLY TO A BLOWOUT PREVENTER STACK

[75] Inventor: Bruce J. Watkins, Houston, Tex.
[73] Assignee: Dril-Quip, Inc., Houston, Tex.
[21] Appl. No.: 984,465
[22] Filed: Dec. 2, 1992
[51] Int. Cl.⁵ .......................................... E21B 33/035
[52] U.S. Cl. .................................. 166/341; 166/344; 166/255
[58] Field of Search ................ 166/355, 379, 363, 84, 166/337, 342, 359, 336

[56] References Cited

U.S. PATENT DOCUMENTS

| | | | |
|---|---|---|---|
| 3,450,421 | 6/1969 | Harwell, Jr. | 166/355 X |
| 3,601,187 | 8/1971 | Tidwell | 166/355 X |
| 3,782,458 | 1/1974 | Slack | 166/355 |
| 3,791,442 | 2/1974 | Watkins | 166/355 X |
| 4,153,112 | 5/1979 | Luke | 166/355 |
| 4,428,433 | 1/1984 | Watkins | 166/355 X |
| 4,557,332 | 12/1985 | Denison et al. | 166/355 |
| 4,640,372 | 2/1987 | Davis . | |
| 4,646,844 | 3/1987 | Roche et al. . | |
| 5,167,283 | 12/1992 | Smith et al. | 166/373 |

FOREIGN PATENT DOCUMENTS 2150614A 11/1984 United Kingdom .

OTHER PUBLICATIONS

Pages 25 and 27 of 1986-87 Hughes Offshore General Catalog.

Primary Examiner—Ramon S. Britts
Assistant Examiner—Frank S. Tsay
Attorney, Agent, or Firm—Vaden, Eickenroht, Thompson, Boulware & Feather

[57] ABSTRACT

Apparatus for connecting the bore through a diverter assembly with the bore through a blowout preventer stack beneath an offshore drilling rig include an upper tubular member adapted to be connected to the diverter assembly to form a lower continuation of the lower end of its bore, a lower tubular member adapted to be connected to the blowout preventer stack to form an upper continuation of the upper end of its bore, and a tubular body extending between and pivotally and sealably connected to the upper and lower tubular members to connect their bores.

5 Claims, 2 Drawing Sheets

APPARATUS FOR CONNECTING A DIVERTER ASSEMBLY TO A BLOWOUT PREVENTER STACK

FIELD OF THE INVENTION

This invention relates generally to the drilling of subsea wells from platforms above the subsea wellhead. More particularly, it relates to improved apparatus for connecting the bore through a diverter assembly with the bore through a blowout preventer stack at the upper end of the subsea wellhead.

BACKGROUND

The purpose of so-called diverter systems is to provide low pressure control over the well during the preliminary stages of drilling, and, for this purpose, the system includes a housing supported with its bore beneath the rotary table on the platform and having one or more side outlets from the bore for connection with drilling mud return lines on the platform. A diverter assembly comprising a tubular body adapted to be lowered into a supported position in the bore of the housing has a port aligned with each side outlet from the bore, and a spool having packing at its lower end is suspended from the body for lowering over the upper end of a conductor extending upwardly from the preventer stack as the body is landed in the bore of the housing. More particularly, the tubular body carries means which seals between it and the housing bore to confine flow within the body into the side outlets with flow normally returning to the rig mud system from which it may be recirculated into the drill string. Packers are adapted to be lowered into and landed in the diverter body to seal about a drill string extending downwardly from the rotary table and through the tubular body leading to the conductor, whereby the drilling fluid returns about the string can be "diverted" into overboard lines connected to the outlets in the housing with reservoirs on the platform.

In prior systems of this type, a packer extending from the diverter body closes around a mandrel and allows for some height adjustment depending on the height of the stack. More particularly, the length of the spool is such that it is able to accommodate some misalignment of the bores of the diverter assembly and stack, as may occur, for example, due to movement of the stack relative to the platform. However, larger and thus taller stacks, necessitating correspondingly shorter spools, make it difficult if not impossible to maintain this essentially fixed connection between the diverter assembly and stack. Also, when the stack is at a substantial depth below water level, the stack experiences even greater movement with respect to the platform. Furthermore, even if the connection is able to flex the required amount under these conditions, there is no way to disconnect and reconnect the lower end of the diverter assembly, as may be required under adverse weather conditions.

There is therefore a need for and the primary object of this invention is to provide apparatus for so connecting the diverter assembly and blowout preventer stack which is of such construction as to accommodate such movement of the stack regardless of its depth, and, more particularly, to provide apparatus of this type which is easily connected to or disconnected from the stack irrespective of the extend of misalignment of the bores of the diverter assembly and stack.

SUMMARY OF THE INVENTION

These and other objects are accomplished, in accordance with the illustrated embodiment of the invention, by apparatus of the type described which includes an upper tubular member adapted to be connected to the diverter assembly to form a lower continuation of the lower end of its bore, a lower tubular member adapted to be connected to the blowout preventer stack to form an upper continuation of the upper end of its bore, and a tubular body extending between the upper and lower tubular members to connect their bores. More particularly, the upper end of the tubular body has a first spherical surface thereabout and the lower end of the upper tubular member has a first packing for sealing engagement with the first spherical surface, and the upper end of the lower tubular member has a second spherical surface thereabout and the lower end of the tubular body has a second packing for sealing engagement with the second spherical surface. Thus, the first spherical surface may rotate within the first packing and the second packing may rotate about the second spherical surface to permit the tubular body to be swung into tilted positions with respect to the axes of the bores, and the tubular body is suspended from the upper tubular member so that the second packing on the lower end of the tubular body may be lowered onto or raised from the lower tubular member regardless of the misalignment of the bores. Preferably, the packings are inflatable into tight sealing engagement with the spherical surfaces.

In the preferred embodiment of the invention, the tubular body includes an upper tubular section suspended from the upper tubular member and having the first spherical surface rotatable about the first packing, a lower tubular section longitudinally slidable with respect to the lower section and having the second packing carried about its lower end for rotation about the second spherical surface, and packing means carried about the outer of the tubular sections to form a sliding seal about the inner tubular section and also preferably inflatable into tight sealing engagement therewith.

More particularly, extendable and retractible actuators spaced about the tubular body are connected to the upper and lower tubular sections, and a means is provided for selectively extending and retracting the actuators so as to control the direction and degree of tilt of the tubular body. Thus, the actuators may be extended and retracted as a group to install or remove the second packing, and selectively extended and retracted so as to swing the tubular body into tilted positions necessary to accommodate the misalignment.

As illustrated, the tubular body is suspended from the upper tubular member by a ring removably mounted on the lower end of the upper tubular member and having an inner diameter beneath and less than the diameter of the first spherical surface of the tubular body.

BRIEF DESCRIPTION OF THE DRAWINGS

In the drawings, wherein like reference characters are used throughout to designate like parts.

DESCRIPTION OF THE PREFERRED EMBODIMENTS

Figure 1A:
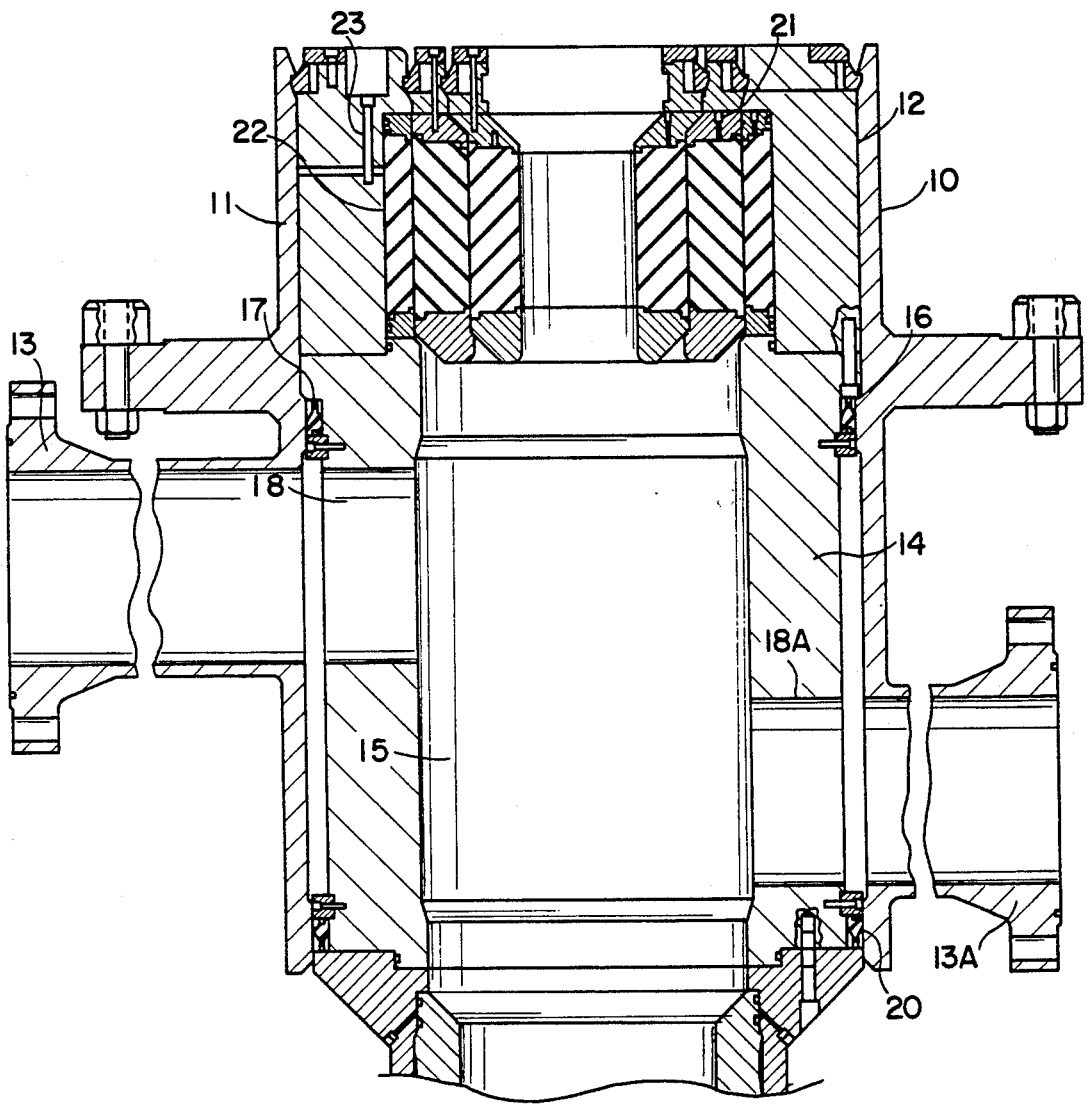
FIGS. 1A and 1B are vertical sectional views of connecting apparatus constructed in accordance with the present invention and showing, in FIG. 1A, its upper end connected to a diverter assembly, and, in FIG. 1B, its lower end connected to a blowout-preventer stack.

With reference now to the details of the above described drawings, the diverter system shown in FIG. 1A, and indicated in its entirety by reference character 10, includes a housing 11 having a bore 12 therethrough and adapted to be supported in a manner well-known in the art beneath the rotary table of the platform on which the drilling rig is mounted. The housing has side outlet 13 connecting with the bore and adapted to have a flow line (not shown) for returning drilling mud to a resevoir on the platform, as well as a side outlet 13A connecting with the bore and adapted to have an overboard line (not shown) connected thereto for "diverting" when required.

As also previously described, the diverter system 10 also includes a tubular body 14 having a bore 15 therethrough and a shoulder 16 thereabout for supporting it on a seat 17 within the bore 12 of the housing. More particularly, the tubular body has openings 18 therethrough for connecting the bore 15 with the side outlets 13 and 13A, and carries seals 19 and 20 thereabout above and below the openings of 18 for confining flow through the outlets 18 and 18A to the side outlets 13 and 13A.

As is common in the art, the system also includes a packer assembly 21 removably disposable within an inwardly inflatable packer 22 carried within the upper end of the bore 15 of the tubular body. The inner diameter of the assembly 21 is adapted to receive drill pipe or casing extending through the diverter assembly and into the well bore there-below, and is adapted to be forced inwardly to seal about the drill pipe by inflation of the packing 22 through fluid supply through ports 23. As shown, the tubular body is latched within the bore of the housing 11, and the packing assembly 21 is latched within the bore of the tubular body opposite the packing assembly 22.

As also previously described, the apparatus of the present invention is so constructed as to connect to the lower end of the bore 15 through the tubular body of the diverter assembly with the upper end of a bore 24 in the blowout preventer stack 24A despite misalignment of the bores. Thus, the apparatus includes an upper tubular member 25 having a bore 26 therethrough adapted to be connected, as by means of latches 27, to the lower end of the bore 15 of the tubular body to form a continuation thereof, as well as a lower tubular member 28 having a bore 29 therethrough axially aligned with the bore 24 of the stack. More particularly, both the upper and lower tubular members are sealed, respectively, with respect to the lower end of the tubular body of the diverter system and the upper end of the blowout preventer stack.

The apparatus for connecting the bores also includes an intermediate tubular body 31 extending between the upper and lower tubular members 25 and 28. More particularly, the upper end of the tubular body 31 has a first spherical surface 32 thereabout for fitting within a first packing 33 within the lower end of the first tubular member 35 so as to permit the upper end of the tubular body 31 to swing about the horizontal axis of the spherical surface 32. The upper end of the tubular body 31 is supported from the lower end of the tubular member 25 by means of a ring 34 on the lower end of the tubular member 25 beneath the packing 33 and having an inner diameter less than the diameter of the spherical surface 32. The ring is removably connected to an enlarged diameter lower end of the tubular body 25 to form a recess above it in which the packing assembly 33 is mounted.

As shown, the packing 33 is preferably inwardly inflatable into tight sealing engagement with the spherical surface 32. For this purpose, it includes an annular sleeve 35 of elastomeric material carried by upper and lower rings disposed within the recess so that the sleeve may be inwardly inflated by fluid pressure supplied to the recess through ports 37 to which flexible hoses or other conduits (not shown) may be connected.

The upper end of the lower tubular member 28 has a second spherical surface 38 thereabout and disposed within a second packing 39 carried within the lower end of the tubular body 31 for sealing engagement therewith. Thus, the lower end of the tubular body is free to swing about the axis of the spherical surface, in much the same manner as its upper end is swingable about the spherical surface 32 on its upper end. Similarly to the packing 33, the packing 39 preferably comprises an annular sleeve 40 of elastomeric material carried by upper and lower rings 41 sealably disposed within the recess. Fluid pressure may also be supplied to the outer side of the sleeve to cause it to tightly engage about the spherical surface 38 through ports 42 formed in the lower end of the tubular body. Hoses or other flexible conduits may be connected for supplying fluid pressure to the sleeve in the same source as to that supplying pressure to the sleeve 35.

Figure 1B:
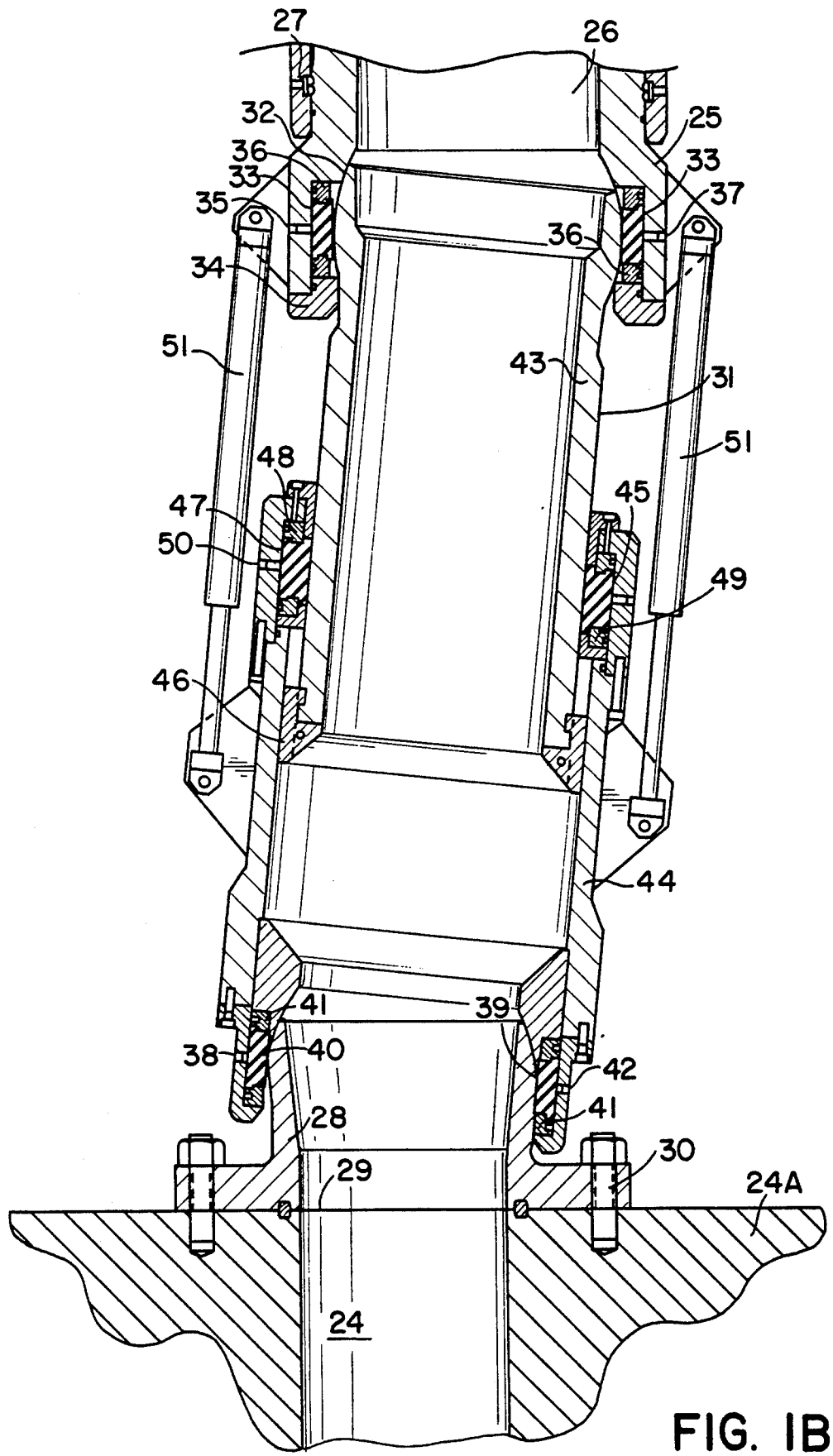

In order to accommodate misalignment of the bores of the diverter system and preventer stack, the tubular body 31 may be tilted to the desired angle as shown in FIGS. 1A and 1B. For this purpose, pressure would be relieved form the sleeves 35 and 40 to permit the spherical surface 32 to turn easily in sleeve 33 and the sleeve 40 to turn easily about the spherical surface 38.

In the preferred and illustrated embodiment of the invention, the tubular body 31 is made up of upper and lower tubular sections 43 and 44 which are arranged telescopically for sliding longitudinally with respect to one another. Thus, the upper tubular section 43 carries the spherical surface 32 at its upper end while the lower tubular section 44 carries the sleeve 39 about its lower end. More particularly, a third packing 45 is carried within the upper end of the lower tubular section of 44 to form a sliding seal with the upper tubular section 43 above an enlargement 46 at its lower end which is guidably slidable within the lower tubular section 44 beneath the packing assembly.

As in the case of the packings 33 and 39, the assembly 45 preferably includes an inwardly inflatable sleeve 47 of elastomeric material carried by upper and lower rings 48 and 49 received within a recess within the upper end of section 44. Thus, the sleeve is inwardly inflatible by means of fluid pressure applied through ports 50 from a remote source, as in the case of the other packing assemblies.

As previously described, the extendable and contractable construction of the tubular body enables it to be retracted to raise its lower end above the lower tubular member as it is lowered onto or raised from the member 28. When the tubular body is properly aligned by the swinging of its upper end within the packing assembly 33, its lower end may be extended to slide packing 39 downwardly over the spherical surface 38.

The tubular body is extendable and contractable by means of fluid actuators 51 (usually four) each pivotally connected at its upper end to the upper tubular member 25 and its lower end to the lower tubular section 44 of the tubular body. Thus, retraction of the actuator 51 raises the lower end of the lower tubular section 44 to permit it to be lowered on to or lifted from the upper end of the lower tubular member, while extension of the actuators permits the lower end of the tubular 44 to be lowered over the upper end of the lower tubular body 28. Fluid may be supplied to opposite sides of the pistons (not shown) of the cylinders of the actuators from any suitable source, as described above in connection with the inwardly inflatible packing assemblies.

More particularly, and again as previously described, the actuators 51 are selectively operable so as to permit one of them to be extended while the other is retracted in order to swing the tubular body about the axis of the upper spherical surface 32. Thus, for example, and as shown in the drawings, the left-hand actuator 51 may be retracted as the right-hand actuator 51 is extended so as to swing the tubular body in a clockwise direction in order to bring the lower end of the tubular section 44 into position for lowering over the upper end of the lower tubular member 28 when the blowout preventer stack is misaligned to the left of the diverter system.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for connecting the bore through a diverter assembly with the bore through a blowout preventer stack beneath an offshore drilling rig, comprising
an upper tubular member adapted to be connected to the diverter assembly to form a lower continuation of the lower end of its bore,
a lower tubular member adapted to be connected to the blowout preventer stack to form an upper continuation of the upper end of its bore,
a tubular body extending between the upper and lower tubular members to connect their bores,
the upper end of the tubular body having a first spherical surface thereabout and the lower end of the upper tubular member having a first packing for sealing engagement with the first spherical surface,
the upper end of the lower tubular member having a second spherical surface thereabout and the lower end of the tubular body having a second packing for sealing engagement with the second spherical surface, whereby
said first spherical surface may rotate within the first packing and the second packing may rotate about the second spherical surface to permit the tubular body to be swung into tilted positions with respect to the axes of the bores, and
means for suspending the tubular body from the upper tubular member, the second packing on the lower end of the tubular body being free to move over the spherical surface of the lower tubular member, so that it may be lowered onto or raised from the lower tubular member.

2. Apparatus as described in claim 1, wherein the packings are inflatable into tight sealing engagement with said spherical surfaces.

3. Apparatus as described in claim 1, wherein said tubular body includes
an upper tubular section suspended from the upper tubular member,
a lower tubular section longitudinally slidable with respect to the lower section and having the second packing carried about its lower end, and packing means carried about the outer of the tubular sections to form a sliding seal about the inner tubular section.

4. Apparatus as described in claim 3, including
extendable and retractible actuators spaced about the tubular body and connecting the upper and lower sections, and
means for selectively extending and retracting the actuators so as to control the direction and degree of tilt of the tubular body.

5. Apparatus as described in claim 1, wherein the means for suspending the tubular body comprises
a ring removably mounted on the lower end of the upper tubular member having an inner diameter beneath and less than the diameter of the first spherical surface of the tubular body.

* * * * *